United States Patent [19]

Kovalick

[11] Patent Number: 4,482,974
[45] Date of Patent: Nov. 13, 1984

[54] APPARATUS AND METHOD OF PHASE-TO-AMPLITUDE CONVERSION IN A SINE FUNCTION GENERATOR

[75] Inventor: Albert W. Kovalick, Santa Clara, Calif.

[73] Assignee: Hewlett-Packard Company, Palo Alto, Calif.

[21] Appl. No.: 407,844

[22] Filed: Aug. 13, 1982

[51] Int. Cl.³ .............................................. G06J 1/00
[52] U.S. Cl. .................................. 364/607; 364/608; 364/718; 364/721; 328/14; 328/142
[58] Field of Search ............... 364/607, 608, 718, 719, 364/720, 721, 722, 851, 852; 328/14, 142; 331/1 A, 25

[56] References Cited

U.S. PATENT DOCUMENTS

| | | | |
|---|---|---|---|
| 3,506,810 | 4/1970 | Katell | 364/608 |
| 4,070,665 | 1/1978 | Glennon | 364/852 X |
| 4,072,940 | 2/1978 | Simon et al. | 364/607 X |
| 4,134,072 | 1/1979 | Bolger | 364/721 X |
| 4,159,527 | 6/1979 | Yahata et al. | 364/721 |
| 4,171,466 | 10/1979 | Carbrey | 364/721 X |
| 4,222,108 | 9/1980 | Braaten | 364/719 X |
| 4,346,448 | 8/1982 | Insam et al. | 364/607 |

Primary Examiner—Jerry Smith
Assistant Examiner—Allen MacDonald
Attorney, Agent, or Firm—Edward Y. Wong

[57] ABSTRACT

A sine wave generator uses a phase-to-amplitude converter (PAC) which functions with a novel multiplier. By using pipelined adders, intermediate amplitude and slope data from storage are combined to get an output amplitude which is equivalent to that from a prior art multiplier but without the objectionable through-put delays inherent in prior art multiplier PAC's.

7 Claims, 11 Drawing Figures

| CLOCK | LATCH 20 OUTPUT |
|---|---|
| 1 | 5 |
| 2 | 10 |
| 3 | 15 |
| 4 | 4 |
| 5 | 9 |
| 6 | 14 |
| 7 | 3 |
| ⋮ | ⋮ |

1 TO 4 ARE QUADRANTS

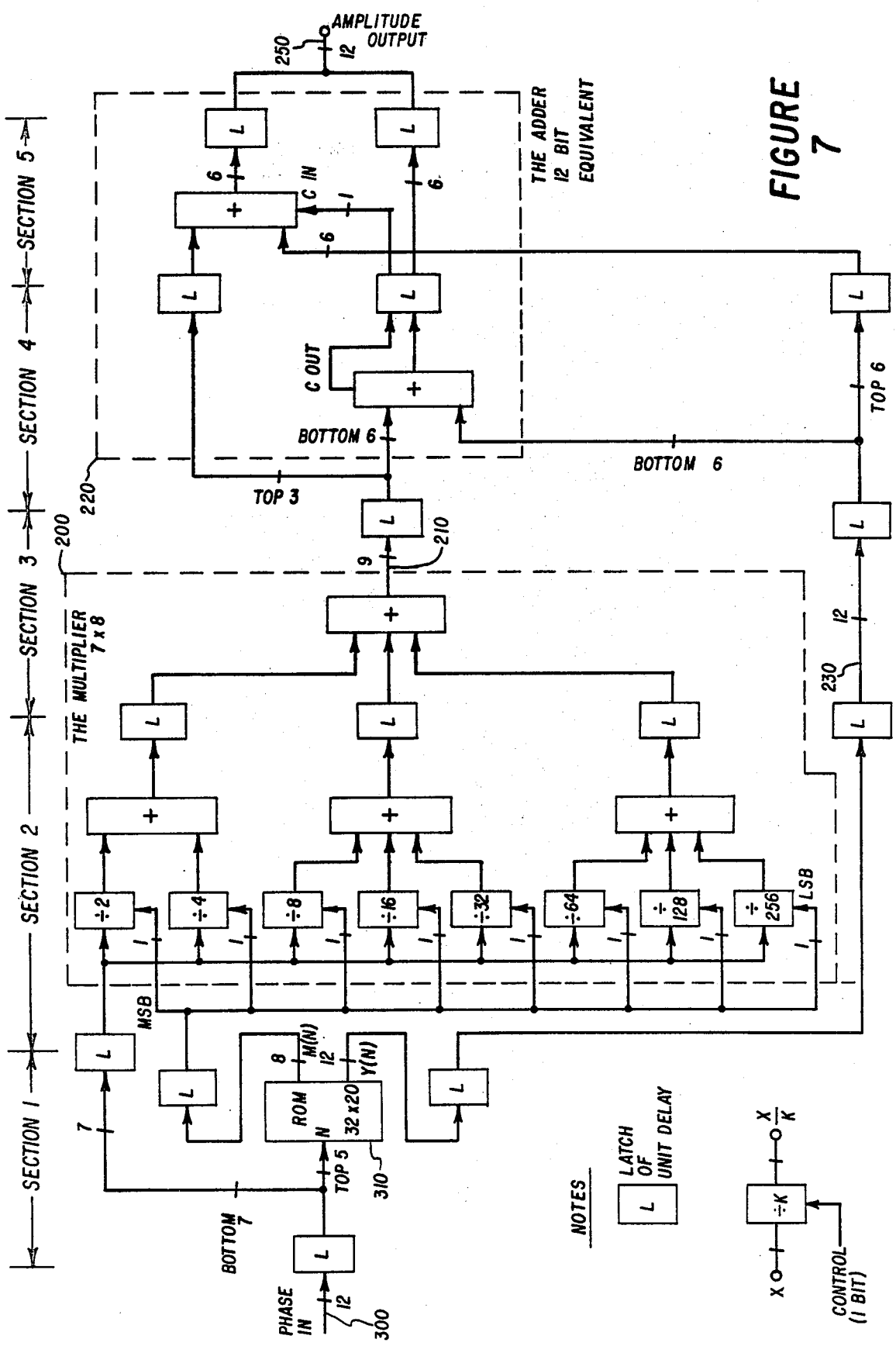

APPARATUS AND METHOD OF PHASE-TO-AMPLITUDE CONVERSION IN A SINE FUNCTION GENERATOR

BACKGROUND OF THE INVENTION

In the art of synthesizing signals, three distinguishable techniques have been used: direct synthesis, indirect synthesis, and numerical synthesis.

In the technique of direct synthesis, the desired signal is produced directly from an oscillator. This technique, however, is limited in frequency. And in synthesizing a wide frequency range, this technique becomes extremely complex and costly. Hence this technique is not widely used for either high frequencies or wide frequency ranges.

In indirect synthesis, phase lock loops with programmable frequency dividers are commonly used to synthesize the desired frequencies. This technique is by far the most widely used at present both in commerical products and in dedicated applications. The method owes its popularity in large part to the advent of inexpensive programmable frequency dividers in integrated circuit form. The result has been a substantial reduction in complexity, especially in comparison with direct synthesis.

However, neither the direct synthesis nor the indirect synthesis technique in the prior art allows for phase-continuous switching of the carrier signal when the desired synthesizer signal is modulated. Furthermore, both techniques require extensive analog components which are subject to drift and malfunction through aging, temperature effects, and the like.

Numerical synthesis with digital techniques is useful for avoiding the above problems. Basically, numerical synthesis consists of generating a stream of points representing a desired signal by using digital logic circuits. Then this numerical data stream is converted into the actual desired signal by means of a digital-to-analog converter (DAC). An example of such a system for synthesizing signals in the prior art is described in U.S. Pat. No. 3,928,813. FIG. 1 shows a block diagram of a typical digital numerical synthesizer known in the art. $F=(\Delta\phi/\Delta T)(\frac{1}{2}\pi)$. If $\Delta T$ is the period of the digital clock, then $\Delta\phi$ uniquely defines the frequency.

Although prior art synthesizers using the numerical synthesis technique result in less complicated synthesizers than those using the direct and indirect synthesizer techniques, these prior art numerical synthesizers nevertheless have a definite drawback: they characteristically have a low output frequency. The numerical synthesizer in accordance with the present invention overcomes this drawback and simultaneously preserves the other advantages of the numerical synthesis technique.

In order to gain a better understanding of the advantages of the preferred embodiment in accordance with the invention, a brief discussion of numerical synthesizers in the prior art follows.

Essential to any numerical synthesizer is a phase accumulator, as shown in FIG. 1. Its function is to generate a linearly increasing digital signal whose value represents phase in radians. The defining relation between frequency and phase is $$F=(\tfrac{1}{2}\pi)(\Delta\phi/\Delta T),$$

where $\Delta\phi$ is a selected value representing a phase increment and $\Delta T$ is the period of the system clock for determining an output frequency. The number of different frequencies available in this synthesizer is then $2^K$, where K is the number of bits in the field for $\Delta\phi$. If K equals 24 and the clock frequency $F_C=1/\Delta T$ is 33.55 MHz, then the frequency resolution is $(33.55\times 10^6)/(2^{24})=2$ Hz. As illustrated in FIG. 1, phase accumulation occurs by repeatedly adding at every clock cycle of 1/T Hz the last phase output to $\Delta\phi$. The phase output, then, at clock cycle N is:

$$\text{phase out}=N\Delta\phi.$$

Eventually the adder in the accumulator will overflow, since it is a modulo device with a modulo of $2^K$. This overflow does not cause a loss of useful phase, however. Since $2^K$ represents $2\pi$ radians, any phase overflow represents the phase of the next cycle of output. This is illustrated in FIG. 2.

Once the phase is available, the next step is to convert it to a sinusoidal wave, that is, a wave whose amplitude varies with time. The amplitude is still maintained in digital form. According to the Nyquist or uniform sampling theory, two points on the sine wave are sufficient to perfectly describe it. If the sample points are not exactly correct in phase and amplitude, then harmonics and spurious signals result. The ideal phase-to-amplitude converter (PAC) is a sine lookup table, such as a prior art read-only-memory device (ROM) with, for example, $2^K$ words, having each word or sine amplitude value infinitely accurate. The ROM 30 in FIG. 1 is an example. In reality, however, only something less than the ideal is available. FIG. 4 shows the PAC input-to-output relationship.

If constraint of infinite amplitude accuracy is reduced to an accuracy of M bits per word, then the ROM size would be $M2^K$ bits. For example, with K=24 and M=12, the ROM would have 16.7 million words of 12 bits each. Chossing M=12 would give an amplitude resolution of 0.024 percent. This ROM is far too large to be practical, and some bits must be ignored. If some significant bits, say L bits, are tapped off the phase accumulator output, then the phase input to the PAC is truncated. This truncation then results in spurious signals in the system. However, if L=14, then the spurious signals are less then −70 dB. Thus, a practical approach is to use a ROM with 12 bits per word and 16K words.

The size of the ROM lookup table can be reduced even more by partitioning each output cycle into quadrants. Only 0°–90° sine information must now be stored in the ROM. This allows the ROM to be 12×4K (48K bits) in size. Although this is a reasonable size, it must have a read access time of at least 30 nanoseconds (for a clock of 33.55 MHz). This access time is very small for this size of ROM. A clock frequency of 33.55 MHz gives a 12 MHz output signal range.

For clock speeds of 60 to 100 MHz the ROM lookup method is the limiting function block in the digital portion of the system. For example, if the $\Delta T$ of FIG. 1 is 10 ns then the ROM sine lookup table would need a read access time of less than 10 ns, i.e., approximately 7 ns, for the case of a 12×4K bit ROM. This is beyond the present state of the art. Also using a 1×4K ROM would require 12 packages.

The technique in accordance with the present invention replaces sine lookup using a ROM and provides faster sine lookup than with a ROM. Also, it provides a small architecture, which may be integrated onto a single chip.

SUMMARY OF THE INVENTION

Instead of using a ROM strictly for amplitude values to synthesize a sine waveform, the ROM is used for storing amplitude and slope information. The slope information from the ROM is multiplied with the input to give a slope output M(N)×X. With the amplitude output Y(N) and the slope output M(N)×X, a sine waveform is defined. Naturally, if the segments are more numerous, the waveform approaches the ideal. In this way, less memory is required to synthesize a waveform with only a slight degradation of the waveform from ideal.

One disadvantage with multipliers is the inherent delay in the arithmetic operation. Multiplying even a 7-bit number with an 8-bit number could be too long, thus limiting the word length usable. To enhance the present scheme so that delays in a multiplier would not be prohibitive, a pipelined scheme incorporating dividers and adders to duplicate the multiplier is used. The result is a novel device to provide continuous phase-to-amplitude conversion for sine waveform generation.

BRIEF DESCRIPTION OF THE DRAWINGS

FIG. 7 shows a detailed preferred embodiment in accordance with the invention.

DETAILED DESCRIPTION OF THE INVENTION

Figure 1:
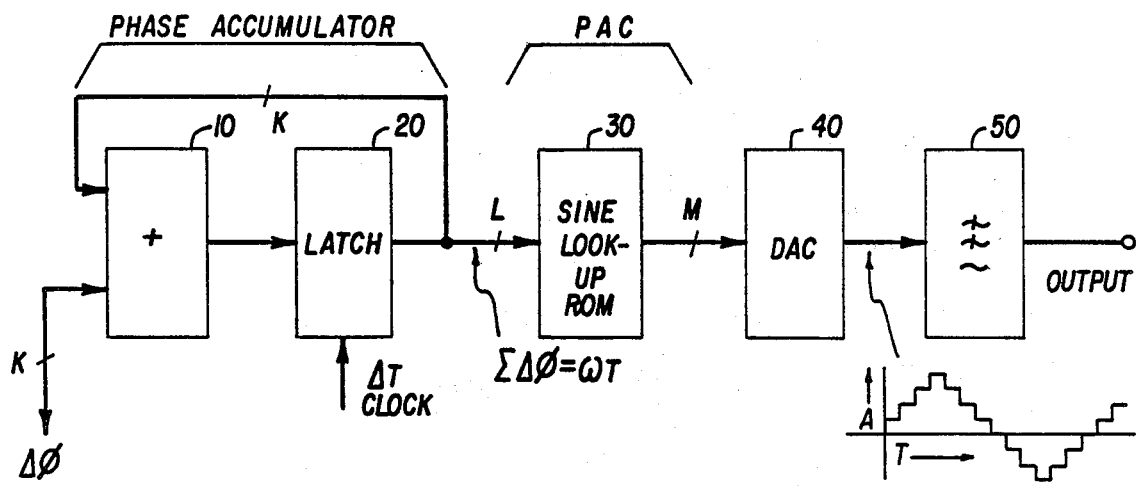
FIG. 1 shows a numerical signal synthesizer in the prior art.
Figure 2:
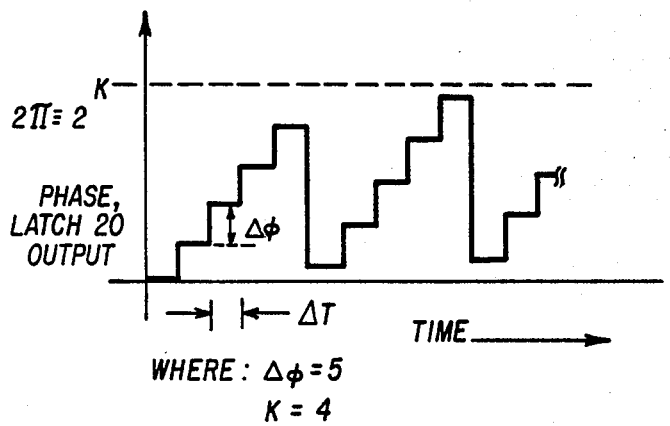
FIG. 2 shows a phase accumulator output in the prior art.
Figure 3:
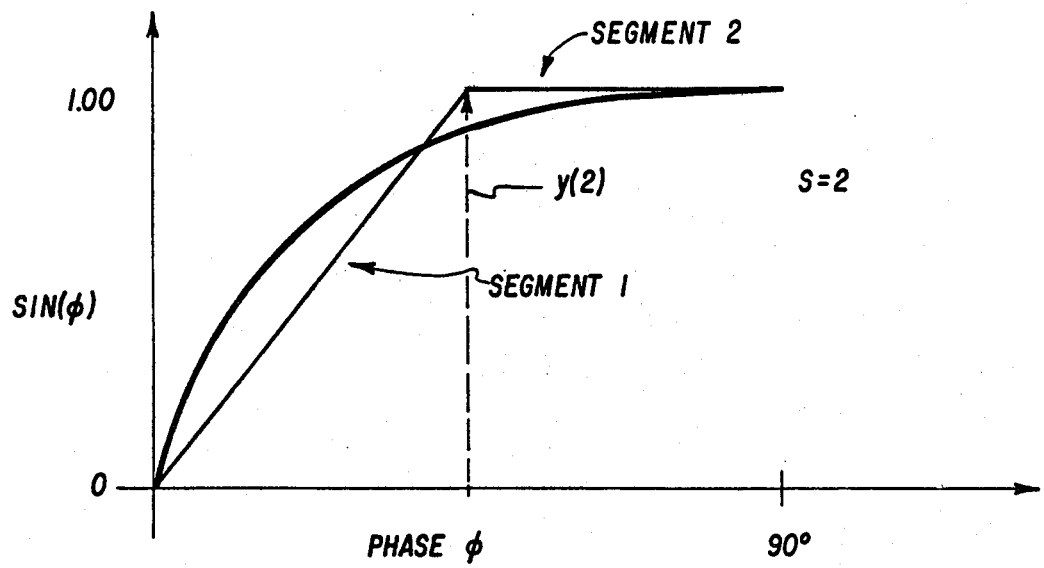
FIG. 3 shows a two-segment one-quadrant approximation of a sine function.

The technique in accordance with the present invention uses linear segments to piecewise approximate a sine function in the 0–90 degree quadrant. By piecing together S number of segments the sine function can be approximated to any degree of accuracy. Analysis shows that for $S=2^A$, where A is an integer, hardware is simplest. FIG. 3 shows a waveform having a chordal segment fit of $S=2$. The maximum departure error in this crude approximation is surprisingly small; it is only ±2.75%. For $S=32$, analysis shows that a 12-bit amplitude accuracy is achievable.

Figure 5:
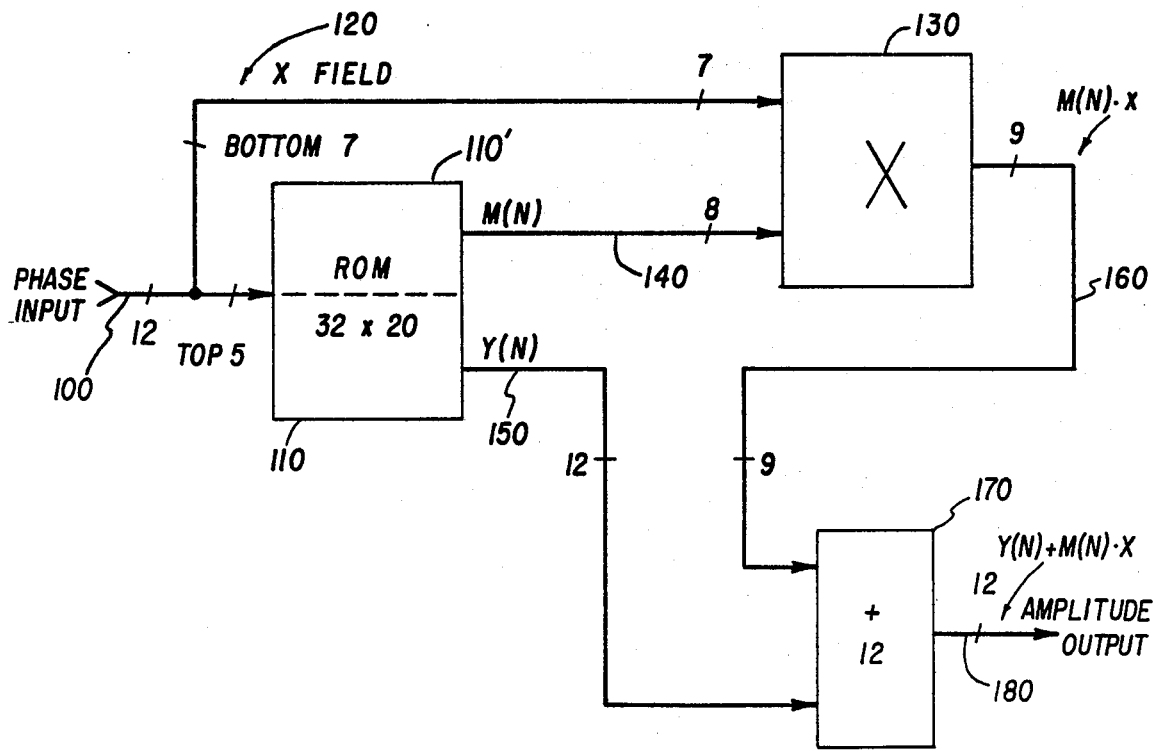
FIG. 5 shows a preferred embodiment in accordance with the invention.
Figure 4A:
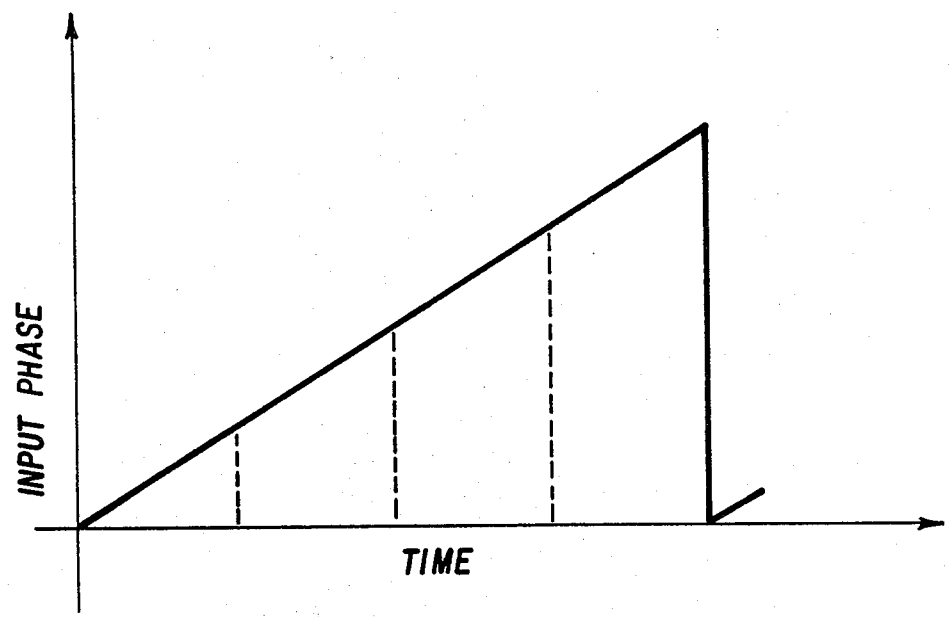
FIG. 4A shows a phase input and FIG. 4B shows an example of a corresponding output of a PAC.
Figure 4B:
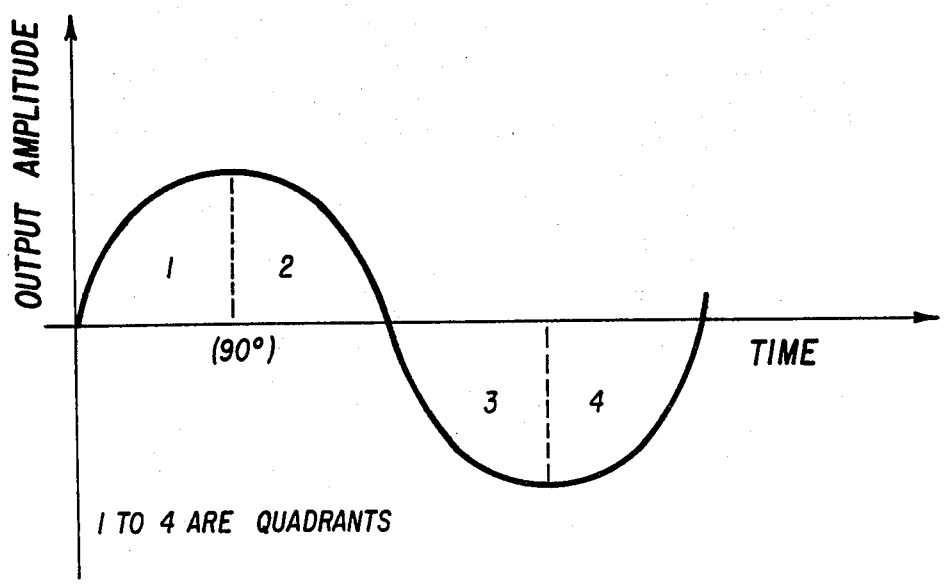

A block diagram of the hardware to implement this invention is shown in FIG. 5. Three blocks are identified: a densely coded ROM 110, a 7×8 multiplier 130, and a 12-bit adder 170. The multiplier 130 has been optimized for a 9-bit output. The ROM 110 has two outputs: an 8-bit slope word and a 12-bit amplitude word. The slope word, M(N), is the slope of segment N, where the integer N is 1 through 32. The amplitude word Y(N) is the approximate amplitude of the sine function at the start of each segment. As is evident from FIG. 3, Y(N) is not the exact value of sine($\phi$), since Y(N) represents only a chordal fit. Thus the total ROM storage needed is only $(8+12)32=640$ bits, rather than 4K×12 bits.

The operation of the phase-to-amplitude converter (PAC) in accordance with the invention is as follows: A 12-bit binary input representing phase (0 to 90 degrees) enters an input port 100. The first, or top, 5 bits are used to address the ROM, 110. These 5 bits directly specify the segment. The last, or lower, 7 bits form a field X 120. This field represents 128 linear points on each segment so the input phase is conveniently split up to form a segment word for selecting 32 segments and a linear staircase word of length 128 steps.

Figure 6A:
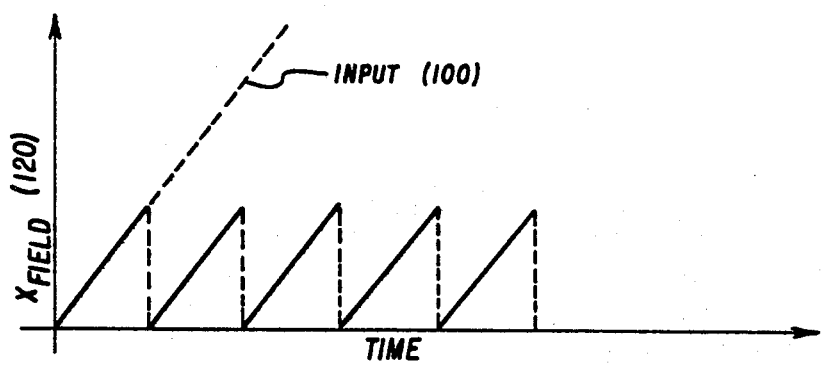
FIG. 6A–6C show the various input waveform relation for a five-segment sine wave approximation in accordance with the invention.
Figure 6B:
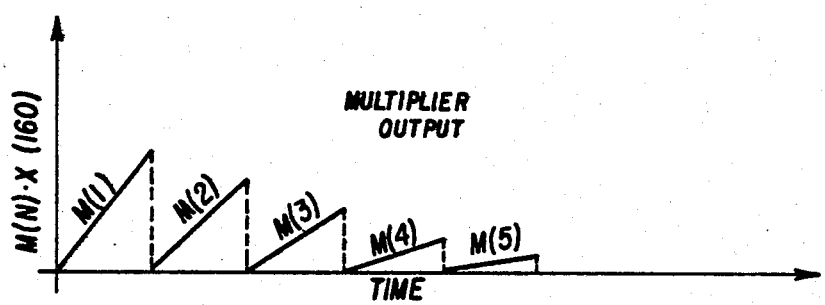
Figure 6C:
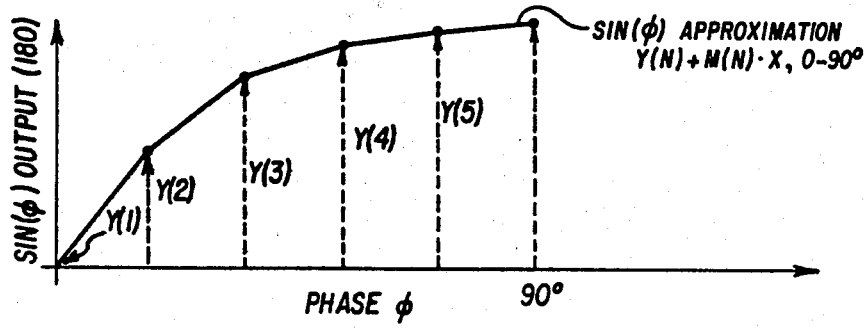

The final approximation at an output port 180 is the sum of Y(N) from the ROM output line 150 and M(N)×X from the multiplier output line 160. FIGS. 6A, 6B, and 6C show the components of the approximation for a 5-segment example. FIG. 6A shows the 12-bit phase input at input port 100. It also shows the X-field 120, i.e., the linear staircase for each segment. FIG. 6B shows the multiplier output M(N)×X, whose slope gets progressively smaller as the phase approaches 90 degrees. Finally, FIG. 6C is the sum of the multiplier output M(N)×X and Y(N), the sine wave approximation at the beginning of each segment. This output is the desired approximated 12-bit sinusoidal waveform.

Using numerical analysis and computer optimization, ROM values M(N) and Y(N) can be picked to achieve 12-bit output accuracy of the approximated sine wave. A direct implementation of FIG. 5 with ECL logic would not meet the desired objective of 7 ns computation rate. The 640-bit ROM is capable of 7 ns access time because of its small size. However, the multiplier and adder impose a speed penalty to prevent meeting the objective.

A feature of the present invention that overcomes these problems is a pipelined architecture. This is essentially a method that breaks an operation into several smaller operations each of which can be performed in the desired time. For example, the multiplier can be designed as a pipelined structure and split into several sections. Each section is isolated by input and output latches. A cascade of sections yields the results of a multiplier with the desired multiplier through-put rate and with only a latent input-to-output delay. If both the multiplier and adder are designed using pipelined techniques the PAC is then capable of the desired through-put rate.

FIG. 7 shows a detailed logic diagram of the pipelined PAC in accordance with the invention. There the latches, L, break larger operations into smaller ones while maintaining a high through-put rate. A total of six delays from the phase input to the amplitude output are present. This fixed delay is not objectionable since it is only a fixed delay in the generation of the output signal. Notice that five computation sections are needed.

The multiplier 200 is designed as a sum-of-products multiplier to allow pipeline latches to be placed at convenient locations. Other types of multipliers make pipelining difficult. The output on output line 210 is equivalent to the output on output line 160 of FIG. 5.

Also included in the PAC is a pipelined adder. This adder splits the 12-bit add into two 6-bit adds. Again, each add is performed in the desired time so the total 12-bit add has the desired through-put rate. The inputs to the adder 220 are on two output lines 230, 210, while the 12-bit output is on the output line 250. The output corresponds to that on output line 180 of FIG. 5. The 12-bit phase is input at the PAC input port 300. From there the input is coupled to a 640-bit ROM 310. This ROM 310 provides the two outputs Y(N) and M(N).

The advantages of FIG. 7 over a purely ROM lookup implementation are manyfold. First, the architecture allows the desired through-put to be achieved while a ROM lookup scheme does not. Secondly, the entire circuit can easily be implemented on a single integrated circuit. This compares favorably to the prior art alternative of requiring a 48K-ROM-lookup table composed of several ROM's to achieve the 12-bit word length of the PAC in accordance with the invention. Furthermore, the input-to-output delay in the preferred embodiment of FIG. 7 is acceptable, unlike the delays in the prior art PAC's using multipliers.

Figure 8:
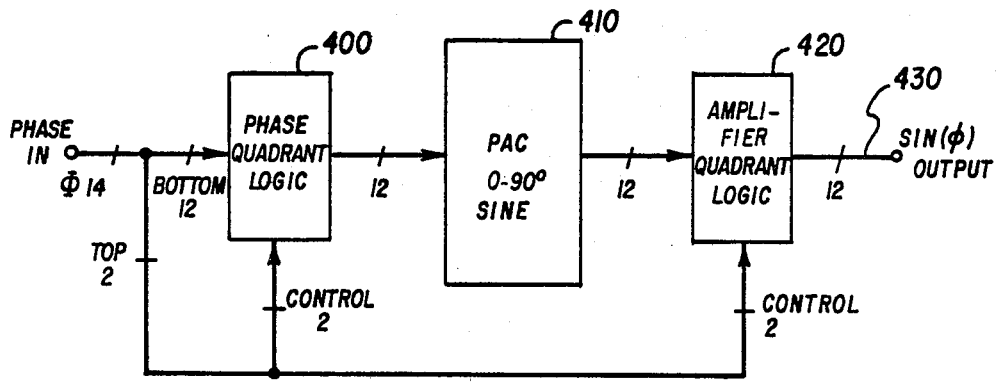
FIG. 8 shows a scheme for completing a sine wave from a quadrant PAC in accordance with the invention.

FIG. 8 shows a PAC 410 joined to a phase quadrant logic 400 and an amplitude quadrant logic 420. Together these components yield a phase-to-amplitude converter equivalent to one having a bit density of $2^{14} \times 12 = 197K$ bits. The entire circuit in FIG. 8 can be integrated onto a single monolithic chip. This architecture allows phase in ($\phi$) to span from zero to 360 degrees. Thus, a complete and continuous sine function is generated.

I claim:

1. A phase-to-amplitude converter comprising
an input port to receive an input binary signal representing phase;
a storage means coupled to said input port for providing an intermediate amplitude signal and a subintermediate slope signal in response to a first portion of said input binary signal;
a multiplier means coupled to said input port and said storage means for providing in response to a second portion of said input binary signal and to said subintermediate slope signal a multiplier output signal representing intermediate slope; and
an adder means coupled to receive said multiplier intermediate slope signal and said intermediate amplitude signal for providing a converter output signal representing amplitude.

2. The phase-to-amplitude converter as in claim 1 wherein said multiplier means further comprises:
a plurality of parallel input ports, each accepting (1) said first portion of said input binary signal and (2) one bit of said subintermediate slope signal;
plurality of parallel adder circuits each connected to a preselected group of said parallel input ports; and
multiplier output port connected to said plurality of parallel adder circuits for providing said intermediate slope signal.

3. A method of converting an input binary signal representing phase to an output binary signal representing amplitude, comprising the steps of:
separating said input phase binary signal into first and second portions;
converting said first portion into a signal representing intermediate amplitude;
converting said second portion into a signal representing intermediate slope;
combining said intermediate slope signal and said intermediate amplitude signal to provide said output amplitude binary signal.

4. The method as in claim 3, wherein said step of converting said first portion further comprises the step of addressing a first memory means for storing amplitude values with said first portion to provide said intermediate amplitude signal.

5. The method as in claim 3 or 4, wherein said step of converting said second portion further comprises the steps of:
addressing a second memory means for storing slope values with said first portion to provide a subintermediate slope signal; and
combining said subintermediate slope signal with said second portion to provide said intermediate slope signal.

6. The method as in claim 5, wherein:
said step of combining said subintermediate slope signal with said second portion comprises multiplying said subintermediate slope signal with said second portion; and
said step of combining said intermediate slope signal and said intermediate amplitude signal comprises adding said intermediate slope signal to said intermediate amplitude signal.

7. The method as in claim 5 wherein said step of combining said subintermediate slope signals with said second portion further comprises:
operating on said second portion with each bit of said subintermediate slope signal in parallel to provide a plurality of resultant data; and combining selected resultant data from said plurality to form said intermediate slope signal.

* * * * *